United States Patent
Mendel

(10) Patent No.: US 12,244,333 B2
(45) Date of Patent: Mar. 4, 2025

(54) PHASE SHIFT DETECTION AND CORRECTION FOR AUDIO-BASED DATA TRANSMISSIONS

(71) Applicant: LISNR, Inc., Cincinnati, OH (US)

(72) Inventor: Oz Mendel, Oakland, CA (US)

(73) Assignee: LISNR, INC., Cincinnati, OH (US)

( * ) Notice: Subject to any disclaimer, the term of this patent is extended or adjusted under 35 U.S.C. 154(b) by 260 days.

(21) Appl. No.: 17/756,351

(22) PCT Filed: Nov. 22, 2019

(86) PCT No.: PCT/US2019/062823
§ 371 (c)(1),
(2) Date: May 23, 2022

(87) PCT Pub. No.: WO2021/101571
PCT Pub. Date: May 27, 2021

(65) Prior Publication Data
US 2022/0407547 A1 Dec. 22, 2022

(51) Int. Cl.
*H04W 4/00* (2018.01)
*H04B 1/10* (2006.01)
(Continued)

(52) U.S. Cl.
CPC ........... *H04B 1/1027* (2013.01); *H04B 11/00* (2013.01); *H04L 43/0858* (2013.01)

(58) Field of Classification Search
CPC .... H04B 1/1027; H04B 11/00; H04B 1/0475; H04B 3/23
See application file for complete search history.

(56) References Cited

U.S. PATENT DOCUMENTS 11,805,161 B2 10/2023 Farrar et al.
2010/0021003 A1 1/2010 Baum et al.
(Continued)

FOREIGN PATENT DOCUMENTS

WO 2021101570 5/2021

OTHER PUBLICATIONS

International Search Report issued in corresponding International application PCT/US19/62823 mailed Feb. 7, 2020.
(Continued)

*Primary Examiner* — Omoniyi Obayanju
(74) *Attorney, Agent, or Firm* — NORTON ROSE FULBRIGHT US LLP

(57) ABSTRACT

Methods and systems for correcting distortions of audio transmissions are provided. In one embodiment, a method is provided that includes receiving an audio transmission that includes symbols. A first portion of the audio transmission including a first subset of the symbols may be identified and compared to an expected sequence having expected symbols. One or more differences may be determined between the first subset of the symbols and the expected symbols and a movement speed between a transmitter and a receiver of the audio transmission may be determined based on the differences. A second portion of the audio transmission may be identified including a second subset of the symbols in the second subset of the symbols may be corrected based on the movement speed between the transmitter and the receiver.

20 Claims, 9 Drawing Sheets

(51) Int. Cl.
  *H04B 11/00* (2006.01)
  *H04L 43/0852* (2022.01)

(56) References Cited

U.S. PATENT DOCUMENTS

| | | |
|---|---|---|
| 2013/0315211 A1 | 11/2013 | Caire et al. |
| 2016/0309278 A1* | 10/2016 | Hiscock ................ G01S 11/06 |
| 2019/0190621 A1 | 6/2019 | Prince et al. |
| 2021/0218527 A1 | 7/2021 | Li et al. |

OTHER PUBLICATIONS

Fauziya et al. "Vector sensor based channel equalizer for underwater communication systems", *IEEE 7$^{th}$ Annual Computing and Communication Workshop and Conference*, pp. 1-5, 2017.

Extended European Search Report issued in corresponding European Application No. 19953378, dated Jul. 7, 2023.

International Search Report and Written Opinion issued in International Application No. PCT/US23/60128 mailed Jun. 7, 2023.

* cited by examiner

PHASE SHIFT DETECTION AND CORRECTION FOR AUDIO-BASED DATA TRANSMISSIONS

CROSS-REFERENCE TO RELATED APPLICATION

This application is a 371 National Application of and claims priority to and the benefit of International Application No. PCT/US2019/062823, filed on Nov. 22, 2019. The contents of the referenced patent application is incorporated into the present application by reference.

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another computing device.

SUMMARY

The present disclosure presents new and innovative methods and systems for correcting distortions of audio signals. In one embodiment, a method is provided comprising receiving an audio transmission including symbols, at least a portion of the symbols corresponding to data modulated onto a carrier signal for transmission by the audio transmission and identifying a first portion of the audio transmission including a first subset of the symbols, the first portion of the audio transmission corresponding to an expected sequence having expected symbols. The method may further include comparing the first subset of the symbols to the expected symbols to identify one or more differences between the first subset of the symbols and the expected symbols and determining, based on the one or more differences between the first subset of the symbols and the expected symbols, a movement speed between a transmitter of the audio transmission and a receiver of the audio transmission. The method may also include identifying a second portion of the audio transmission different from the first portion of the audio transmission, the second portion of the audio transmission including a second subset of the symbols and correcting the second subset of the symbols based on the movement speed between the transmitter and the receiver.

In a second aspect according to the first aspect, identifying the one or more differences between the first subset of the symbols and the expected symbols comprises identifying a phase difference between at least one of the first subset of the symbols and at least one of the expected symbols.

In a third aspect according to the second aspect, the expected symbols contain expected frequencies. Comparing the first subset of the symbols to the expected symbols to identify one or more differences between the first subset of the symbols and the expected symbols may further comprise, for each symbol of the first subset of the symbols identifying a first frequency contained by the symbol, identifying a corresponding expected symbol from among the expected symbols that contains an expected frequency with the same or similar frequency as the first frequency, and calculating a phase difference between the symbol and the corresponding expected symbol.

In a fourth aspect according to any of the second and third aspects correcting the second subset of the symbols comprises calculating, based on the phase difference between the at least one of the first symbol and the expected symbols, one or more phase corrections for the second subset of the symbols and correcting a phase of at least one of the second subset of the symbols according to the phase correction.

In a fifth aspect according to the fourth aspect, calculating one or more phase corrections for the second subset of the symbols comprises calculating a phase drift between consecutive symbols of the expected symbols and calculating the one or more phase corrections for the second subset of the symbols based on the phase drift.

In a sixth aspect according to the fifth aspect, the phase drift is calculated such that the phase corrections change linearly for consecutive symbols of the expected symbols.

In a seventh aspect according to any of the first through sixth aspects, determining the movement speed comprises determining a correlation between the differences and determining the movement speed based on the correlation.

In an eighth aspect according to any of the first through seventh aspects, the movement speed is determined to represent movement of at least one of the transmitter and the receiver along an axis extending between the transmitter and the receiver.

In a ninth aspect according to any of the first through eighth aspects, the transmitter initially generates the first portion of the audio transmission to be identical to the expected sequence.

In a tenth aspect according to the ninth aspect, the first portion of the audio transmission is a preamble of the audio transmission indicating a beginning of the audio transmission.

In an eleventh aspect according to the ninth aspect, the first portion of the audio transmission is a training sequence of the audio transmission different from a preamble of the audio transmission indicating a beginning of the audio transmission.

In a twelfth aspect according to any of the first through eleventh aspect, the second portion of the audio transmission includes the portion of the symbols corresponding to the data.

In a thirteenth aspect, a system is provided comprising a processor and a memory. The memory may store instructions which, when executed by the processor, cause the processor to receive an audio transmission including symbols, at least a portion of the symbols corresponding to data modulated onto a carrier signal for transmission by the audio transmission and identify a first portion of the audio transmission including a first subset of the symbols, the first portion of the audio transmission corresponding to an expected sequence having expected symbols. The memory may store further instructions which, when executed by the processor, cause the processor to compare the first subset of the symbols to the expected symbols to identify one or more differences between the first subset of the symbols and the expected symbols and determine, based on the one or more differences between the first subset of the symbols and the expected symbols, a movement speed between a transmitter of the audio transmission and a receiver of the audio transmission. The memory may store still further instructions which, when executed by the processor, cause the processor to identify a second portion of the audio transmission different from the first portion of the audio transmission, the second portion of the audio transmission including a second subset of the symbols and correct the second subset of the symbols based on the movement speed between the transmitter and the receiver.

In a fourteenth aspect according to the thirteenth aspect, the memory stores further instructions which, when performed by the processor while identifying the one or more differences between the first subset of the symbols and the expected symbols, cause the processor to identify a phase difference between at least one of the first subset of the symbols and at least one of the expected symbols.

In a fifteenth aspect according to the fourteenth aspect, the expected symbols contain expected frequencies. The memory may store further instructions which, when performed by the processor while comparing the first subset of the symbols to the expected symbols to identify one or more differences between the first subset of the symbols and the expected symbols cause the processor to, for each symbol of the first subset of the symbols identify a first frequency contained by the symbol, identify a corresponding expected symbol from among the expected symbols that contains an expected frequency with the same or similar frequency as the first frequency, and calculate a phase difference between the symbol and the corresponding expected symbol.

In a sixteenth aspect according to any of the fourteenth and fifteenth aspects, the memory stores further instructions which, when performed by the processor while correcting the second subset of the symbols, cause the processor to calculate, based on the phase difference between the at least one of the first symbol and the expected symbols, one or more phase corrections for the second subset of the symbols and correct a phase of at least one of the second subset of the symbols according to the phase correction.

In the seventeenth aspect according to the sixteenth aspect, the memory stores further instructions which, when performed by the processor while calculating one or more phase corrections for the second subset of the symbols, cause the processor to calculate a phase drift between consecutive symbols of the expected symbols and calculate the one or more phase corrections for the second subset of the symbols based on the phase drift.

In an eighteenth aspect according to any of the thirteenth through seventeenth aspects, the memory stores further instructions which, when performed by the processor while determining the movement speed, cause the processor to determine a correlation between the differences and determine the movement speed based on the correlation.

In a nineteenth aspect according to any of the thirteenth through eighteenth aspects, the movement speed is determined to represent movement of at least one of the transmitter and the receiver along an axis extending between the transmitter and the receiver.

In a twentieth aspect, a non-transitory, computer-readable medium is provided storing instructions which, when executed by a processor, cause the processor to receive an audio transmission including symbols, at least a portion of the symbols corresponding to data modulated onto a carrier signal for transmission by the audio transmission and identify a first portion of the audio transmission including a first subset of the symbols, the first portion of the audio transmission corresponding to an expected sequence having expected symbols. The non-transitory, computer-readable medium may store further instructions which, when executed by a processor, cause the processor to compare the first subset of the symbols to the expected symbols to identify one or more differences between the first subset of the symbols and the expected symbols and determine, based on the one or more differences between the first subset of the symbols and the expected symbols, a movement speed between a transmitter of the audio transmission and a receiver of the audio transmission. The non-transitory, computer-readable medium may store still further instructions which, when executed by a processor, cause the processor to identify a second portion of the audio transmission different from the first portion of the audio transmission, the second portion of the audio transmission including a second subset of the symbols and correct the second subset of the symbols based on the movement speed between the transmitter and the receiver.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure relate to phase shift correction of audio transmissions that are used to transmit data between computing devices.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi® links between computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
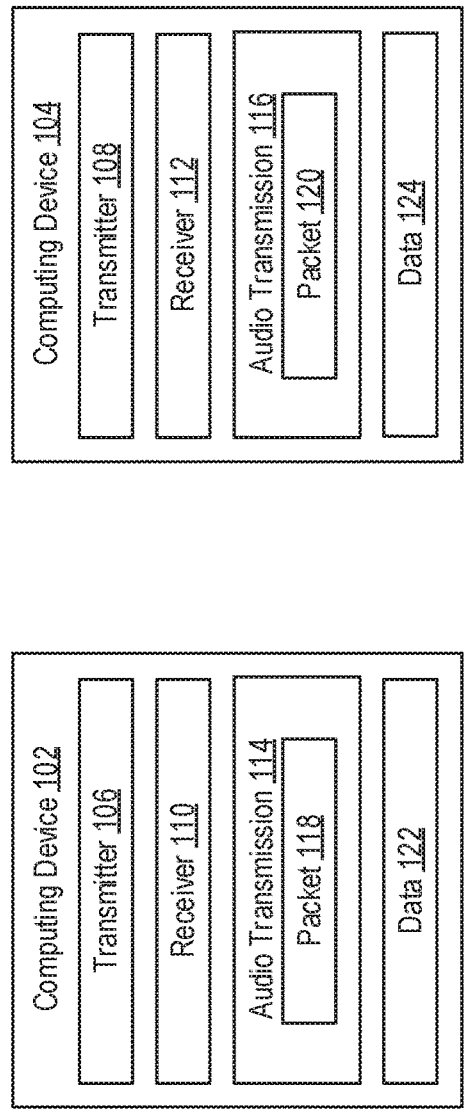
FIG. 1 illustrates a system according to an exemplary embodiment of the present disclosure.

Therefore, there exists a need to wireless transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a speaker external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals) capable of being processed by a processor of the computing device, such as microphones. In other implementations, the receivers 110, 112 may be implemented as a microphone built into the computing device 102, 104. For example, one or both of the computing devices may be a smart phone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing both a speaker and a microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112). In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

However, transmitting data by audio transmissions includes other limitations. In particular, audio transmissions are susceptible to types of interference and/or distortions that are either not present or less prevalent for data transmissions by electromagnetic signals. For instance, when transmitting data by electromagnetic signals, movements of a computing device transmitting the electromagnetic signals may cause negligible changes to the electromagnetic signals when received by another computing device. However, when data is transmitted using sound waves (e.g., using audio transmissions), movements of one or both of a transmitting and a receiving computing device may degrade the received sound waves. In particular, movements of the transmitting and/or receiving computing device may cause phase shifts within audio transmission, which can interfere with the synchronization and subsequent processing of the audio transmission, including extraction of data from the audio transmission.

Therefore, there exists a need to identify and correct phase shifting distortions for audio transmissions. One solution to this problem is to measure differences between a first portion of an audio transmission and a corresponding, predetermined audio sequence. For example, phase differences between the first portion of the audio transmission and the predetermined audio sequence may be measured to estimate a movement speed between a transmitter and a receiver of the audio transmission. A second portion of the audio transmission, such as a payload of the audio transmission, may be corrected based on the estimated movement speed between the transmitter and the receiver. In this way, the computing device that receives the audio transmission can properly account for phase shifts and/or time delays of received audio transmissions. Furthermore, because the correction is performed by the computing device receiving an audio transmission, these techniques can account for interference and disturbances that occur during or after transmission of the audio transmission without requiring special processing by the computing device that transmits the audio transmission.

Figure 2:
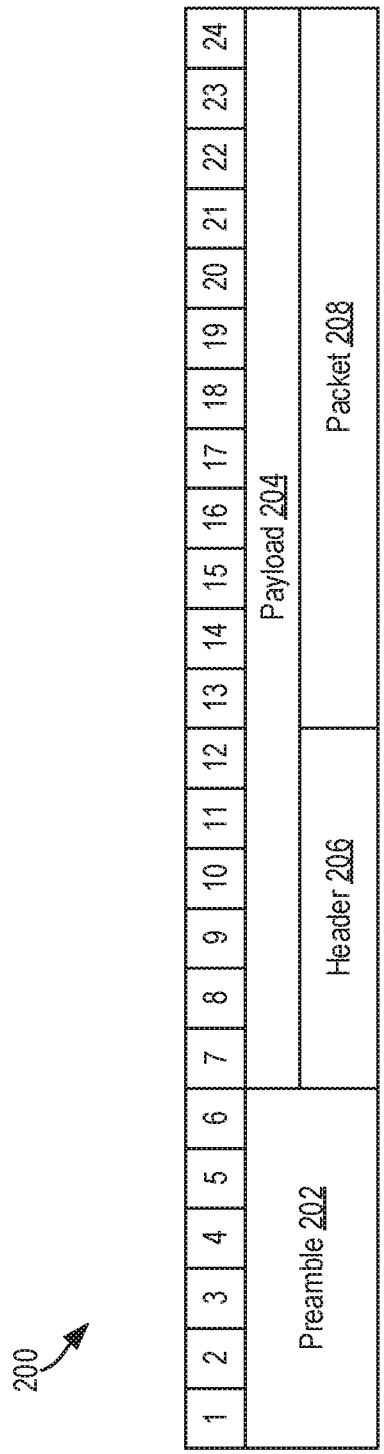
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 2 ms of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated onto an audio channel (e.g., one or more predetermined carrier signals including a predetermined baseband signal such as a pulse-shaped complex number and/or a predetermined carrier frequency) in order to encode information in the audio transmission 200. In particular, information may be encoded by modulating or varying the phase of the audio channel for each symbol 1-24.

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined symbols produced at predetermined points of time (e.g., according to a predetermined phase difference pattern and/or frequency pattern). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

The preamble 202 and the payload 204 may be modulated to form the audio transmission 200 using similar encoding strategies (e.g., similar encoding phases). Accordingly, the preamble 202 and the payload 204 may be susceptible to similar types of interference (e.g., similar types of frequency-dependent attenuation and/or similar types of frequency-dependent delays). Proper extraction of the payload 204 from the audio transmission 200 may rely on proper demodulation of the payload 204 from an audio carrier signal and proper recognition of phase differences for the symbols of the payload. Therefore, to accurately receive the payload 204, the computing device receiving the audio transmission 200 must account for the interference.

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

Figure 3:
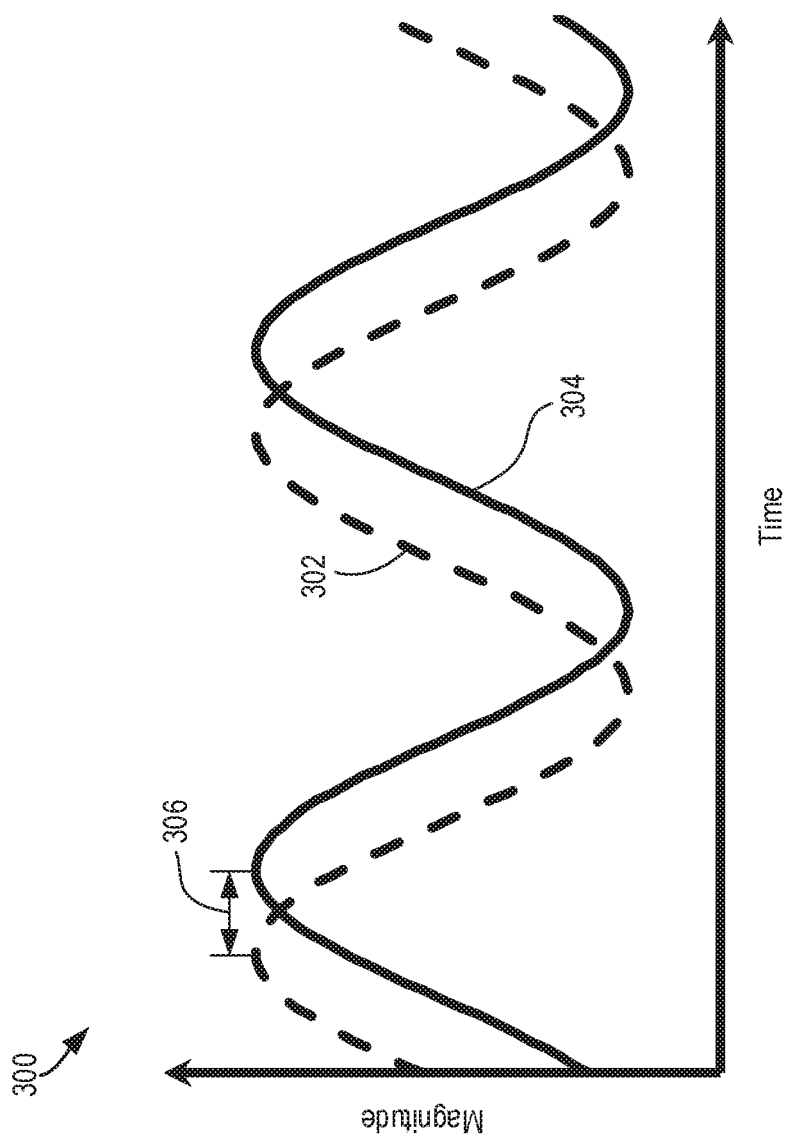
FIG. 3 illustrates a plot of phase shifted audio transmissions according to an exemplary embodiment of the present disclosure.

FIG. 3 illustrates a plot 300 of phase shifted audio transmissions according to an exemplary embodiment of the present disclosure. The plot 300 includes signals 302, 304, which may correspond to two different signals. In particular, the signals 302, 304 may correspond to symbols of an audio transmission. For example, the signal 302 may represent an expected signal contained by a symbol of an audio transmission (e.g., the preamble or other training sequence of the audio transmission) and the signal 304 may represent a received signal contained by the symbol of the audio transmission (e.g., the signal as actually received by a receiving computing device).

As depicted, both signals 302, 304 have the same frequency. However, the signal 304 occurs after signal 302 (i.e., the signal 304 is phase shifted relative to the signal 302). In particular, the signal 304 is delayed by a phase shift 306 relative to the signal 302. As explained above, the phase shift 306 may be caused by movement between a transmitter and a receiver of the audio transmission. In particular, if the transmitter is moving away from the receiver and/or if the receiver is moving away from the transmitter, a phase shift 306 resulting in a delay of the signal 304 may occur.

Other types of phase shifts may also occur. For example, in other instances, a phase shift may result in the signal 304 occurring before the signal 302. For example, if the computing device transmitting the audio signal moves toward the computing device receiving the audio signal and/or the computing device receiving the audio signal moves toward the computing device transmitting the audio signal, a phase shift may result that causes the signal 304 to occur earlier than the signal 302.

As explained above, phase shifts may be used to encode information in audio transmissions. Phase shifts may similarly be used in the symbols of the preamble of audio transmissions. For example, FIG. 3 illustrates a plot 400 of desired phase differences for a preamble according to an exemplary embodiment of the present disclosure. Referring to FIG. 2, the preamble may correspond to a preamble 202 of an audio transmission 200 transmitted by a computing device. The plot 400 indicates the relative phase differences between signals received at multiple times within an audio transmission (e.g., within the preamble of a received audio transmission). The times T1-T6 may correspond to symbols of a received audio transmission. For example, and referring again to FIG. 2, the times T1-T6 may correspond to the symbols 1-6 of the preamble 202.

When an audio transmission is initially transmitted, each time T1-T6 may correspond to a signal with a corresponding, predetermined phase difference (e.g., a phase difference caused by a phase shift relative to the first symbol of the preamble). The plot 400 indicates these phase differences at times T1-T6 corresponding to the symbols 1-6. In particular, the plot 400 indicates the phase differences (in radians) relative to the phase of the signal received at time T1. As depicted, the signals received at times T1-T6 have phase differences that decrease. Namely, the phase differences decrease by 0.25 radians for each subsequent time T1-T6 (e.g., for subsequent symbols) and decrease from a phase difference of 0 radians at time T1 to a phase difference of −1.25 radians at time T6. These phase differences may be predetermined (e.g., predetermined to indicate the presence of an audio transmission.

As depicted, the preamble includes six predetermined phase differences that decrease in frequency from time T1 to time T6. However, other configurations may include additional or fewer predetermined signals with phase differences (e.g., additional or fewer symbols in the preamble). Further, the predetermined phase differences may follow alternative patterns. In particular, other implementations may include predetermined phase differences that increase in frequency over time, or that follow any other pattern or progression over time. Also, the depicted plot 400 may correspond to a portion of the audio transmission other than the preamble, such as a portion of the header of the audio transmission.

In still further embodiments, rather than containing symbols with known phase differences of the audio carrier signal, the preamble may include symbols containing corresponding, predetermined frequencies. For example, each time T1-T6 may correspond to known frequencies for the corresponding symbols 1-6. The frequencies for the symbols of the preamble may correspond to a known pattern of the preamble (e.g., descending frequencies, ascending frequencies, and/or another frequency patterns).

To account for movement of one or both of the receiving computing device and the transmitting computing device, computing devices receiving audio transmissions may estimate a movement speed between the transmitting and receiving computing devices. To do so, computing devices receiving audio transmissions may, determine a phase shift of one or more symbols of the audio transmission.

Figure 5:
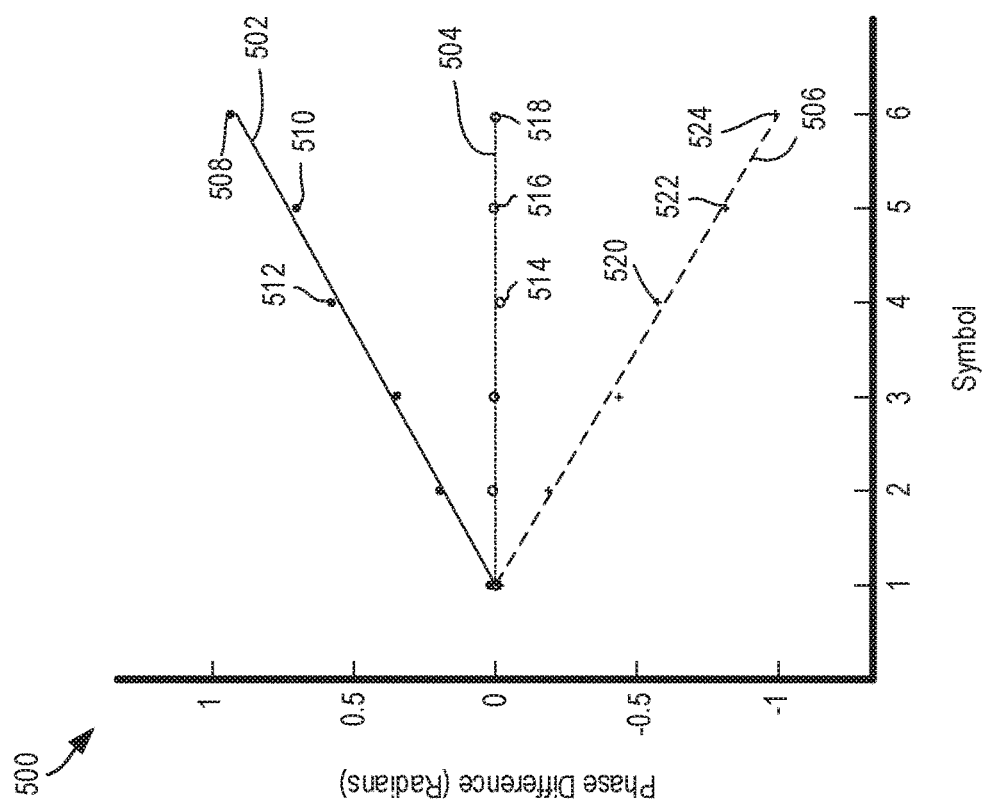
FIG. 5 illustrates a plot of phase differences according to an exemplary embodiment of the present disclosure.

Phase shifts such as the phase shift 406 may occur for multiple symbols in an audio transmission. For example, FIG. 5 illustrates a plot 500 of phase differences according to an exemplary embodiment of the present disclosure. The plot 500 includes lines 502, 504, 506 that correspond to audio transmissions with different movement speeds. For example, the line 502 may correspond to an audio transmission where the transmitter is moving away from the receiver and/or where the receiver is moving away from the transmitter. The line 504 may correspond to an audio transmission with minimal movement of the transmitter and receiver. The line 506 may correspond to an audio transmission where the transmitter is moving toward the receiver and/or where the receiver is moving toward transmitter.

The plot 500 depicts changes in the phase differences for six symbols of the audio transmissions and different scenarios, each scenario corresponding to a line 502, 504, 506. The six symbols may correspond to a preamble of the audio transmission, such as symbols 1-6 of the preamble 202. The six symbols may also correspond to another portion of the audio transmission, such as a training sequence or other expected sequence within the audio transmission. The phase differences may be measured by comparing received signals for the symbols of the audio transmission to expected signals for the symbol of the audio transmission (e.g., to an expected phase of a signal of the symbol of the preamble 202). For example, the phase differences for the lines 502, 504, 506 may be determined by comparing received audio transmissions to expected audio transmissions, similar to determining the phase shift 306 of the plot 300. In particular, the phase differences for the lines 502, 504, 506 may be determined by comparing the phases of signals received for each symbol to expected phases for the symbol (e.g., expected phases and/or phase differences, such as the phase differences indicated in the plot 400). The phase differences as depicted in the plot 500 are measured in radians, where 2π radians represents a complete cycle of the signal (e.g., a peak-to-peak cycle of the signal. The phase differences may additionally or alternatively be measured according to other units. For example, the phase differences may be measured as a time difference between the expected signal (e.g., the signal 402) and the received signal (e.g., 404). Positive phase differences may indicate delays (e.g., where the received audio transmission occurs later than the expected audio transmission), while negative phase difference may indicate the received audio transmission occurs before the expected audio transmission.

As shown, when the transmitter or receiver moves, the phase shift may change between symbols of the auditory transmission. For example, the phase differences for the audio transmission corresponding to line 502 increase for subsequent symbols of the audio transmission. In particular, the phase differences for the line 502 increase from about zero radians for the first symbol to about one radian for the sixth symbol. As another example, the phase differences for the audio transmission corresponding to the line 506 decrease for subsequent symbols. In particular, the phase differences for the line 506 decrease from about zero radians for the first symbol to about negative one radians for the sixth symbol. By contrast, the line 504 does not indicate a significant change in phase difference for subsequent symbols.

Accordingly, changes in phase difference between symbols of an audio transmission may indicate movement of one or both of the transmitter and the receiver. For example, the line 502 indicates increasing phase differences and is associated with an audio transmission involving a transmitter moving away from a receiver and/or a receiver moving away from a transmitter of the audio transmission. Therefore, increases in phase differences may indicate such movements of the transmitter and/or receiver. As another example, the line 506 indicates decreasing phase differences and is associated with an audio transmission involving a transmitter moving toward a receiver and/or a receiver moving toward a transmitter of the audio transmission. Therefore, decreases in phase difference may indicate such movements of the transmitter and/or receiver. Further, no or minimal changes to the phase difference may indicate minimal movement between the transmitter and receiver of an audio transmission. For example, the line 504 indicates minimal changes in phase differences and corresponds to an audio transmission with minimal movement of the transmitter and/or receiver.

Additionally, the rate of change of phase differences between symbols of an audio transmission may also indicate a speed of movement. For example, larger changes of phase differences between symbols of an audio transmission may indicate faster movement. As a specific example, a line increasing from a phase difference of zero for the first symbol to a phase difference of 0.5 radians for the sixth symbol may correspond to a scenario with slower movement (e.g., slower movement of the transmitter and/or receiver of the audio transmission) than the audio transmission corresponding to the line 502. As another example, a line decreasing from a phase difference of zero for the first symbol to a phase difference of −0.5 radians for the sixth symbol may correspond to a scenario with slower movement than the audio transmission corresponding to the line 506.

The lines 502, 504, 506 may be determined based on determined differences for symbols from received audio transmissions. For example, differences 508, 510, 512, 514, 516, 518, 520, 522, 524 may be identified for the six symbols of received audio transmissions. Only a subset of the differences 508, 510, 512, 514, 516, 518, 520, 522, 524 include corresponding reference numbers, but it should be understood that measurements may be made for all six symbols of the received transmissions. The line 502, 504, 506 may then be identified based on the differences 508, 510, 512, 514, 516, 518, 520, 522, 524 for the received transmission. For example, the line 502, 504, 506 may be determined by finding a correlation (e.g., a line of best fit or other statistical correlation) for the differences 508, 510, 512, 514, 516, 518, 520, 522, 524. The lines 502, 504, 506 may then be utilized to determine whether the transmitter and/or receiver of an audio transmission moved.

Figure 6:
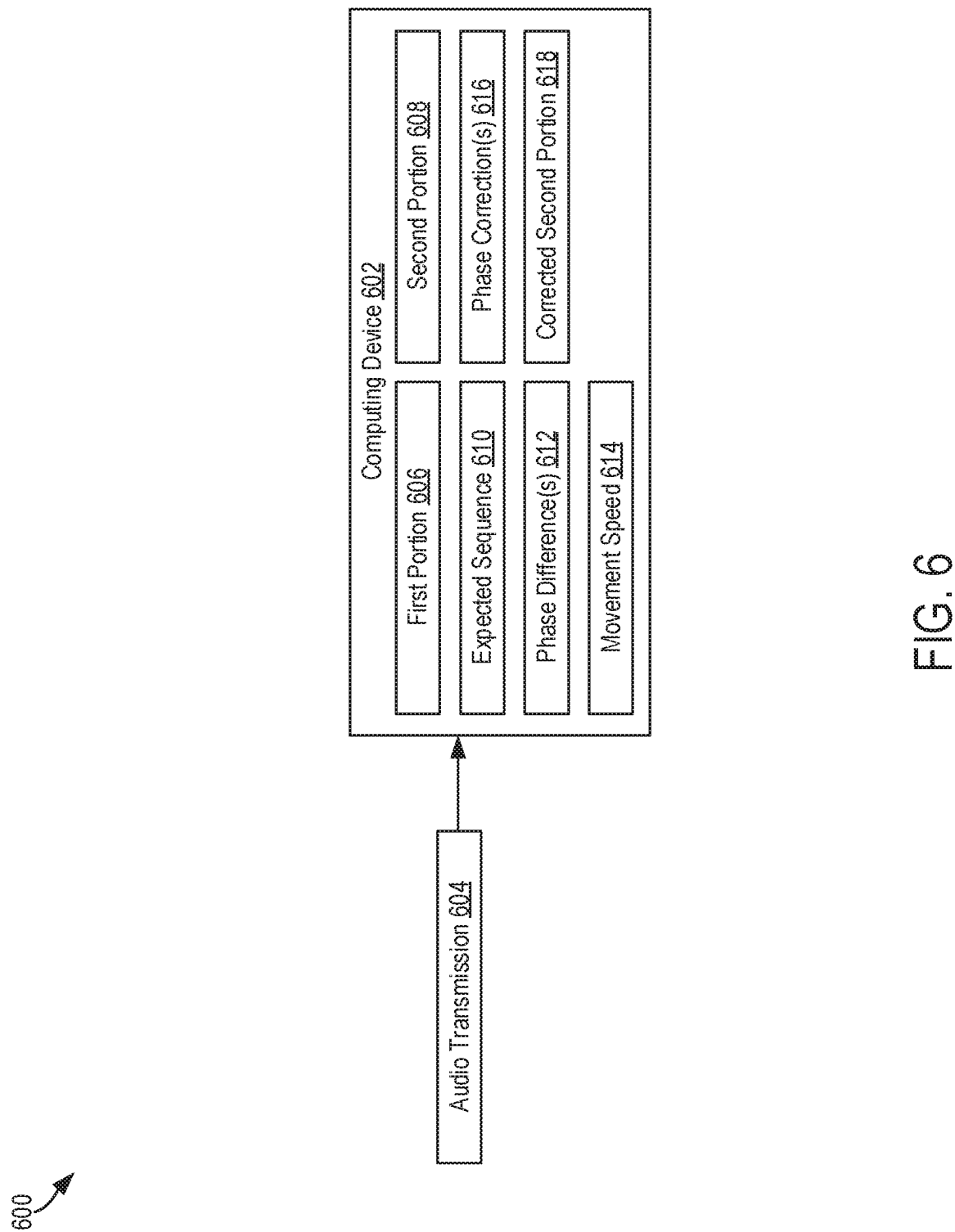
FIG. 6 illustrates a system according to an exemplary embodiment of the present disclosure.

FIG. 6 illustrates a system 600 according to an exemplary embodiment of the present disclosure. The system 600 may be configured to detect and correct for interference of audio transmissions resulting from movement of the transmitter and/or receiver of the audio transmission. The system 600 includes a computing device 602 and an audio transmission 604. The computing device 602 may receive the audio transmission 604. For example, the computing device 602 may be an exemplary implementation of one or both of the computing devices 102, 104 and may receive the audio transmission 604 via a receiver 110, 112. The audio transmission 604 may be generated to contain data, e.g., data encoded into one or more symbols of at least a portion of the audio transmission 604. For example, the data may be contained in a packet included with the audio transmission 604.

However, during transmission of the audio transmission 604, the transmitter and/or receiver of the audio transmission 604 may move relative to one another. In particular, the transmitter and/or receiver may move along an axis that connects the transmitter and receiver (e.g., may experience movement along a "line of sight" between the transmitter and the receiver). This type of movement may cause interference with the audio transmission 604, which may result in, e.g., phase shifts for symbols of the audio transmission. These phase shifts may result in inaccuracies during subsequent processing of the audio transmission 604 (e.g., subsequent demodulation and/or extraction of data stored within the audio transmission 604). Therefore, to maximize the accuracy of such subsequent processing, it may be necessary to detect and correct for movement of the transmitter and/or receiver of the audio transmission.

To detect movement of transmitter and/or receiver, the computing device 602 may identify a first portion 606 of the audio transmission 604. The first portion 606 may be identified as a part of the audio transmission 604 that corresponds to an expected sequence 610. The expected sequence 610 may contain one or more symbols that occur at known times and contain signals having a known frequency and/or phase. In particular, the expected sequence 610 may contain signals that the first portion 606 was generated to include (e.g., before transmission and reception of the audio transmission 604). In certain implementations, the first portion 606 may correspond to the preamble of the audio transmission 604 and the expected sequence 610 may contain the preamble as generated prior to transmission of the audio transmission. In additional or alternative implementations, the first portion 606 may correspond to other parts of the audio transmission 604. For example, the audio transmission 604 may include one or more training sequences in addition or alternatively to the preamble. The training sequences may include symbols containing known frequencies at known phases. The training sequences may therefore be identified as the first portion 606 of the audio transmission 604.

The computing device 602 may also identify one or more phase differences 612 between the first portion 606 and the expected sequence 610. The computing device 602 may identify the phase differences 612 on a per-symbol basis. For example, the computing device 602 may identify corresponding symbols of the first portion 606 and the expected sequence 610 and may identify the one or more phase differences 612 between the corresponding symbols. The phase differences 612 may be determined by comparing the signals of the corresponding symbols and determining an amount by which the phase of the symbol from the first portion 606 differs from the phase of the symbol from the expected sequence 610.

The computing device 602 may also determine a movement speed 614 between the transmitter and the receiver of the audio transmission 604. For example, the movement speed 614 may indicate whether the transmitter and/or receiver are moving closer together or whether the transmitter and/or receiver are moving farther apart. In particular, the movement speed 614 may indicate whether the transmitter and/or receiver are moving closer together or farther apart along an axis connecting the transmitter and the receiver. The movement speed 614 may also indicate an estimate of the magnitude of movement speed 614 (e.g., how fast the transmitter and/or receiver are moving relative to one another) between the transmitter and the receiver of the audio transmission 604. To determine the movement speed 614, the computing device 602 may analyze how the phase differences change between corresponding symbols of the first portion 606 and the expected sequence 610. For example, the computing device 602 may determine that the transmitter and receiver are moving farther apart if the phase differences 612 between the first portion 606 and the expected sequence 610 increase for subsequent symbols. As another example, the computing device 602 may determine that the transmitter and receiver are moving closer together if the phase differences 612 between the first portion 606 and the expected sequence 610 decrease for subsequent symbols. The computing device 602 may further determine the magnitude of the movement speed 614 based on the rate of change of the phase differences 612. In particular, as further explained above, if the phase differences 612 increase or decrease at a greater rate between the corresponding symbols of the first portion 606 and the expected sequence 610, the computing device 602 may determine that the movement speed 614 is larger (e.g., that the transmitter and/or receiver are moving faster relative to one another).

The computing device 602 may also correct phase shifts within the audio transmission 604. For example, the computing device 602 may identify a second portion 608 of the audio transmission 604 and may correct phase difference of symbols within the second portion 608. The second portion 608 may include one or more portions of the audio transmission 604 not included in the first portion 606. For example, the second portion 608 may include all or part of the payload of the audio transmission 604. As another example, the second portion 608 may be selected to include at least a portion of data included within the audio transmission. In certain implementations, the second portion 608 may include all of the audio transmission 604 (e.g., to correct phase shifts for the entire audio transmission 604).

The computing device 602 may calculate phase corrections 616 for the second portion 608. The phase corrections 616 may be calculated to offset phase shifts within the second portion 608 caused by movement of the transmitter and/or receiver of the audio transmission 604. The phase corrections 616 may therefore be calculated according to the movement speed 614. As illustrated in FIG. 5, when the transmitter and/or receiver move further from one another, the phase differences 612 increase for subsequent symbols within audio transmissions. When the transmitter and/or receiver are moving closer to one another, the phase differences decrease for subsequent symbols within audio transmissions. Therefore, depending on the type of movement speed 614, the computing device 602 may calculate the phase corrections 616 to increase or decrease for subsequent symbols within the second portion 608. In particular, if the movement speed 614 indicates that the transmitter and/or receiver are moving further apart, the phase corrections 616 may be calculated to increase across the symbols of the second portion 608. Also, if the movement speed 614 indicates that the transmitter and/or receiver are moving closer together, the phase corrections 616 may be calculated to decrease across the symbols of the second portion 608.

The computing device 602 may then apply the phase corrections 616 to the second portion 608 to generate the corrected second portion 618. The corrected second portion 618 may represent a version of the second portion 608 of the audio transmission 604 that is corrected to remove phase shifts caused by movement of the transmitter and/or receiver of the audio transmission 604. Because the phase shifts are removed in the corrected second portion 618, the corrected second portion 618 may represent a more accurate version of the second portion 608 and may therefore be utilized for subsequent processing (e.g., processing to extract stored data and/or packets from the audio transmission 604). To generate the corrected second portion 618, the computing device 602 may apply the phase corrections 616 to the symbols of the second portion 608. In applying the phase corrections 616, the computing device 602 may offset or otherwise adjust timing information of the signals contained by the symbols of the second portion 608. For example, the computing device 602 may identify a corresponding phase correction from the phase corrections 616 for a symbol of the second portion 608 and may apply the corresponding phase correction to the symbol by adjusting the timing information of the signal according to the corresponding phase correction. This procedure may be repeated for all or part of the symbols within the second portion 608 to generate the corrected second portion.

The computing device 602 may be implemented by a computing system. For example, although not depicted, the computing device 602 may contain a processor and a memory that implement at least one operational feature of the computing device 602. For example, the memory may contain instructions which, when executed by the processor, cause the processor to implement at least one operational feature of the computing device 602.

Figure 7:
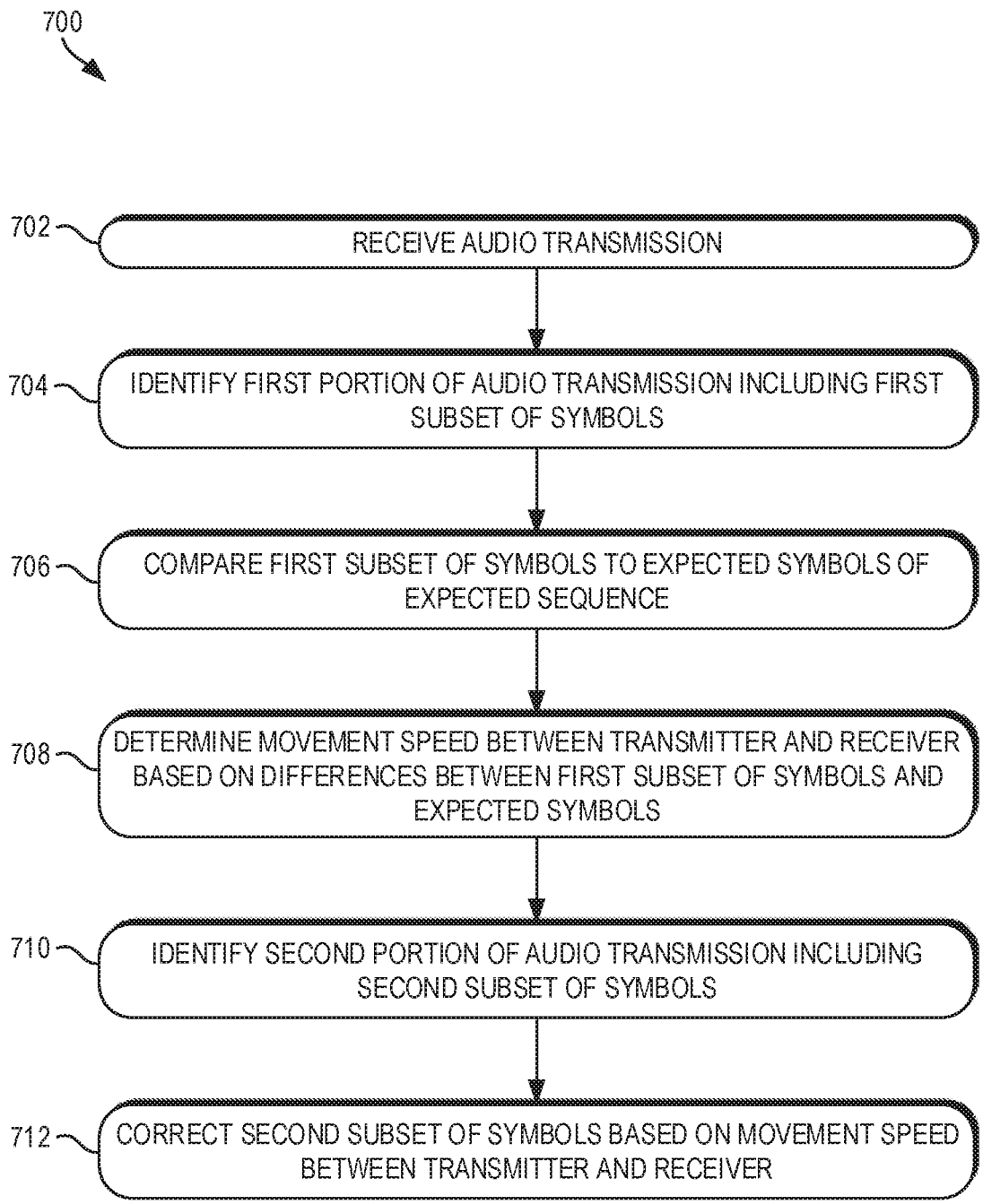
FIG. 7 illustrates a method according to an exemplary embodiment of the present disclosure.

FIG. 7 illustrates a method 700 according to an exemplary embodiment of the present disclosure. The method 700 may be performed to determine a movement speed of a transmitter and/or receiver of an audio transmission and to correct interference for at least a portion of the audio transmission caused by the movement of the transmitter and/or receiver. The method 700 may be implemented on a computer system, such as the system 600. For example, the method 700 may be implemented by the computing device 602. The method 700 may also be implemented by a set of instructions stored on a computer readable medium that, when executed by a processor, cause the computer system to perform the method. For example, all or part of the method 700 may be implemented by a CPU and a memory of the computing device 602. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with receiving an audio transmission (block 702). For example the computing device 602 may receive an audio transmission 604 containing data. The audio transmission 604 may include multiple symbols which contain symbols encoding or otherwise containing data and/or other information for transmission by the audio transmission 604. A first portion of the audio transmission may be identified containing a first subset of symbols (block 704). For example, the computing device 602 may identify a first portion 606 of the audio transmission 604. The first portion 606 may contain a first subset of the symbols of the audio transmission 604. For example, the first subset of the symbols contained by the first portion 606 may correspond to a known set of symbols. In particular, the first portion 606 may have initially been generated (e.g., before transmission) to be identical to or to resemble an expected sequence 610 containing expected symbols that are known prior to receiving the audio transmission 604. For example, the expected sequence 610 may be the same for each received audio transmission 604 and/or may change according to a known pattern for each received audio transmission 604. Accordingly, the computing device 602 may store a copy of the expected sequence 610 corresponding to the first portion 606.

The first subset of the symbols may be compared to the expected symbols of the expected audio sequence (block 706). For example, the computing device 602 may compare the first subset of symbols from the first portion 606 to the expected symbols of the expected sequence 610. In comparing the first subset of symbols to the expected symbols, the computing device 602 may identify one or more differences between the first subset of symbols and the expected symbols. In particular, the computing device 602 may compare symbols from the first subset of symbols to corresponding symbols from the expected symbols and may identify one or more differences between the symbols of the received audio transmission and the corresponding symbols from the expected symbols. In certain implementations, the differences may include phase differences between the first subset of symbols and the expected symbols. Further details regarding comparisons between the first subset of symbols and the expected symbols are discussed below in connection with the method 800 and FIG. 8.

A movement speed between the transmitter and receiver of the audio transmission may then be identified based on the differences between the first subset of symbols and the expected symbols (block 708). As explained above, the differences between the first subset of symbols and the expected symbols may include phase differences between the first subset of symbols and the expected symbols and may therefore indicate phase shifts during transmission of the audio transmission 604. As explained above, the phase shifts may be caused by movement between the transmitter and receiver (e.g., the transmitter and/or receiver moving further away from or closer to one another). In particular, such phase shifts may be caused by movement of the transmitter and/or receiver along an axis connecting the transmitter and receiver (e.g., "line of sight" movement of the transmitter and/or receiver).

Changes in the phase differences for subsequent symbols of the first subset of symbols and the expected symbols may therefore indicate movement of the transmitter and/or receiver. Therefore, the computing device 602 may analyze changes in the phase differences for subsequent symbols to determine the movement speed. In particular, the computing device 602 may identify a correlation for the phase differences, such as the lines 502, 504, 506, and may identify phase drifts between the symbols as changes to the phase differences between the symbols. The computing device may then use the rate of change (e.g., the slope) of the correlation to determine the movement speed 614 of the transmitter and/or receiver. In particular, if $\Delta\theta$ represents the phase drift per symbol, the velocity may be determined as $$v = \frac{\Delta\theta}{2\pi}\lambda/T_{symbol},$$

where $\lambda$ represents the wavelength of the carrier signal of the audio transmission 604 and $T_{symbol}$ represents the duration of each symbol. For example, as depicted, the phase drift $\Delta\theta$ for line 502 is about 0.15 radians/symbol. The duration of each symbol $T_{symbol}$ may be 2 ms and, assuming a 18.6 kHz carrier frequency, the carrier signal wavelength is about 0.7 inches. In such a scenario, the velocity may be determined as $$v = \frac{0.15}{2\pi}0.7 \text{ in}/2 \text{ ms} \cong 11.1 \text{ in/sec.}$$

As explained further above, a positive movement speed 614 may indicate that the transmitter and/or receiver of the audio transmission 604 are moving further from one another and a negative movement speed 614 may indicate that the transmitter and/or receiver of the audio transmission 604 are moving closer to one another.

A second portion of the audio transmission may then be identified (block 710). For example, the computing device 602 may identify a second portion 608 of the audio transmission 604. The second portion 608 of the audio transmission may include a second subset of symbols of the audio transmission 604. The second subset of symbols may differ at least in part from the first subset of symbols. As explained further above, the second portion 608 may correspond to a portion of the audio transmission 604 containing data for transmission. For example, the second portion 608 may contain a packet of data for transmission by the audio transmission 604. Other implementations for selecting the second portion 608 are discussed above.

The second subset of symbols may be corrected based on the movement speed between the transmitter and receiver (block 712). For example, the computing device 602 may correct the second subset of symbols based on the movement speed 614. In particular, the computing device 602 may correct the second subset of symbols by determining the different phase shifts for each symbol caused by the movement speed 614 of the transmitter and/or receiver (e.g., the changed phase shift for the second subset of symbols). For example, the computing device 602 may determine phase corrections 616 for the second subset of symbols. The phase corrections 616 may be determined based on the phase drift $\Delta\theta$ of the phase differences 612.

For example, to determine the phase corrections 616, the computing device 602 may project the phase differences 612 of the first subset of symbols for other symbols within the audio transmission 604 (e.g., earlier and/or later symbols within the audio transmission 604). For example, where the first portion 606 is the preamble of the audio transmission 604 (e.g., symbols 1-6 of the audio transmission), the second portion may include the payload of the audio transmission 604 (e.g., symbols 7-24 of the audio transmission). To determine the phase corrections 616, the computing device 602 may project the phase differences 612 of the first subset of symbols 1-6 to the second subset of symbols 7-24. In certain implementations, the projection may be based on the correlation of the differences between the first subset of symbols and the expected symbols (e.g., the phase drift). For example, the computing device 602 may determine a phase difference, indicated by the correlation phase drift with for the first symbol (e.g., the symbol 7). The phase correction 216 may then be identified to undo the phase difference. For example, the phase correction 216 may be identified as the opposite of the identified phase shift. As a specific example, if the phase difference of the symbol 7 is 1.2 radians, the phase correction 216 of the symbol may be −1.2 radians. The phase corrections 616 for subsequent symbols (e.g., symbols 8-24) may be determined based on the phase correction 616 for the first symbol and the phase drift $\Delta\theta$ between consecutive symbols (e.g., so that the phase corrections 616 change linearly for consecutive symbols). For example, the phase correction 216 for symbol 8 may be determined by subtracting the phase drift per symbol $\Delta\theta$ from the phase correction 216 for symbol 7 and the phase correction for symbol 9 may be determined by subtracting the phase drift per symbol $\Delta\theta$ from the phase correction 216 for symbol 8. In certain implementations, the phase corrections 216 may be identified by first identifying phase differences for the second subset of symbols and then determining the phase corrections 216 to be the opposite of the phase shifts. In still further embodiments, phase corrections 216 may not be identified. Instead, phase differences may be identified for the second subset of symbols and the second subset of symbols may be corrected according to the identified phase differences.

Once the phase corrections 216 are determined, the second subset of symbols may be corrected by applying the phase corrections 216 to the second subset of symbols. For example, the computing device 602 may identify the phase corrections 216 corresponding to the second subset of symbols and may adjust the phase of the signals included in the symbols according to the corresponding phase correction 216. For example, the computing device 602 may adjust timing information for the signals to shift the phase of the signals as indicated by the corresponding phase correction 216. The corrected second subset of symbols may then be stored in a corrected second portion 618, which may be utilized for subsequent processing of all or part of the audio transmission 604. For example, the corrected second portion 618 may be used in subsequent processing to extract packets and/or data transmitted by the audio transmission 604.

In describing the method 700 above, examples were given that involved processing an entire audio transmission during a single execution of the method 700. However, in practice, at least portions the method 700 may be repeated separately for different parts of an audio transmission. For example, in addition or alternative to the preamble, the audio transmission may include one or more training sequences including expected symbols containing expected frequencies and expected phases. The method 700 may be repeated for each of the training sequences. For example, in addition to a preamble at symbols 1-6, an audio transmission may include a training sequence halfway through the training sequence at symbols 13-18. Blocks 704-712 may then be repeated twice to fully process the audio transmission 604: (i) once with symbols 1-6 being identified as the first portion and symbols 7-12 identified as the second portion and (ii) once with symbols 13-18 identified as the first portion and symbols 19-24 identified as the second portion. Repetition of the blocks 704-712 may occur in sequence (e.g., the computing device 602 may perform iteration (i) and may then perform iteration (ii)) or in parallel (e.g., the computing device 602 may perform iterations (i) and (ii) at least in part at the same time).

Furthermore, in addition to the method 700, the computing device 602 may implement additional error correction and/or detection systems for different types of interference that may impact the audio transmission 604. For example, the computing device 602 may also include error correction and/or detection systems configured to address other types of movement of the receiver and/or transmitter (e.g., movements of the transmitter and/or receiver that occur orthogonal to an axis connecting the transmitter and receiver). To properly balance between the various error correction and/or detection systems, certain blocks of the method 700 may be optional. For example, in certain implementations the computing device 602 may not perform blocks 710-712 if the movement speed 614 does not exceed a predetermined threshold. In such implementations, when the movement speed 614 is below the predetermined threshold, movement of the transmitter and/or receiver may not introduce sufficient interference to justify the computational and/or processing delays of correcting the second subset of symbols. For example, the predetermined threshold may be set so that movement speeds at or above 1 inch per second are corrected according to the blocks 710-712.

Figure 8:
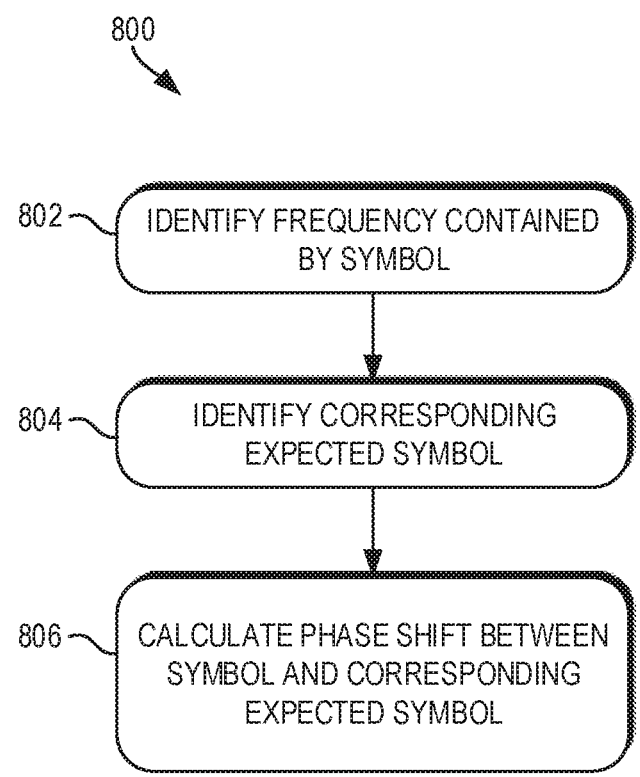
FIG. 8 illustrates a method according to exemplary embodiments of the present disclosure.

FIG. 8 illustrates a method 800 according to exemplary embodiments of the present disclosure. The methods 800 may be implemented on a computer system, such as the system 600. For example, the methods 800 may be implemented by the computing device 602. The methods 800 may also be implemented by a set of instructions stored on a computer readable medium that, when executed by a processor, cause the computer system to perform the method. For example, all or part of the methods 800 may be implemented by a CPU and a memory of the computing device 602. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks described may be optional.

The method 800 may be performed to compare a first subset of symbols from an audio transmission to expected symbols from an expected sequence. For example, the method 800 may be performed to at least partially implement block 706 of the method 700. The method 800 may begin with identifying a phase difference of a signal contained by a symbol (block 802). For example, the computing device 602 may identify a phase difference of a signal contained by a symbol of the first portion 606 of the audio transmission 604. As explained previously, each symbol may contain a signal with a phase-shifted carrier frequency. The phase shift may be identified by comparing the phase of the signal to the phase of a first symbol of the first portion 606 of the audio transmission 604 (e.g., the first symbol of the preamble).

A corresponding expected symbol may then be identified (block 804). The corresponding expected symbol may be identified from an expected sequence 610 corresponding to the first portion 606. The expected sequence 610 may include expected symbols containing identical or similar phase differences to the phase differences contained by the first portion 606 (e.g., prior to transmission of the audio transmission 604). For example, the expected sequence 610 may be a copy of the first portion 606 as initially generated prior to transmission of the audio transmitter. The corresponding expected symbol may therefore be identified as they symbol from the expected symbols with a same or similar phase shift as of the symbol identified in block 702. The same or similar phase shift may be identified as any phase shift that differs from the phase shift of the symbol by less than a predetermined threshold (e.g., 0.1 radians, 0.5 radians, 10% of the phase shift of the symbol, 20% of the phase shift of the symbol, 50% of the phase shift of the symbol) The corresponding expected symbol may additionally or alternatively be identified as the symbol from the expected symbols in the same symbol position as the symbol identified in block 702. For example, the second symbol of the expected symbols may be identified as the corresponding symbol for the second symbol of the first portion 606.

Figure 4:
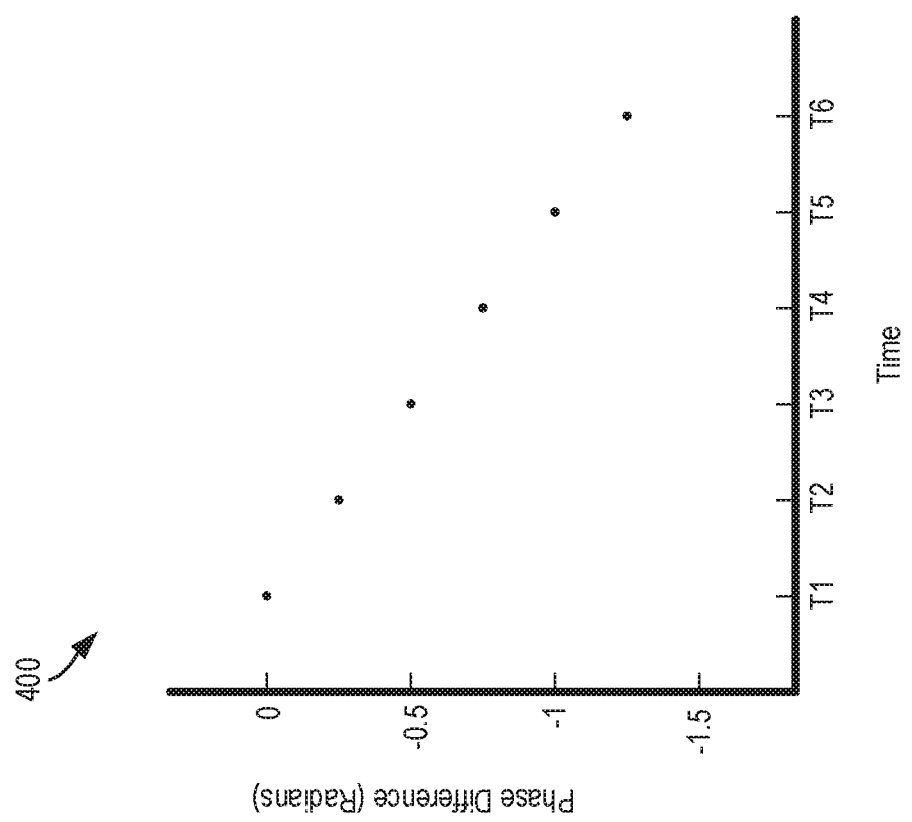
FIG. 4 illustrates a plot of a preamble according to an exemplary embodiment of the present disclosure.

A phase difference may then be calculated between the symbol and the corresponding expected symbol (block 806). For example, the computing device 602 may calculate the phase difference between the symbol and the corresponding expected symbol. The phase difference may be calculated, as depicted in FIG. 4, as the difference in time or radians between the signal of the symbol and the signal of the corresponding expected symbol (e.g., the difference in time or radians between occurrences of one or more corresponding features of the signals, such as peaks of the signals).

The method 800 may be repeated to process multiple symbols from the first subset of symbols. For example, the method 800 may be performed to process each of the first subset of symbols.

Figure 9:
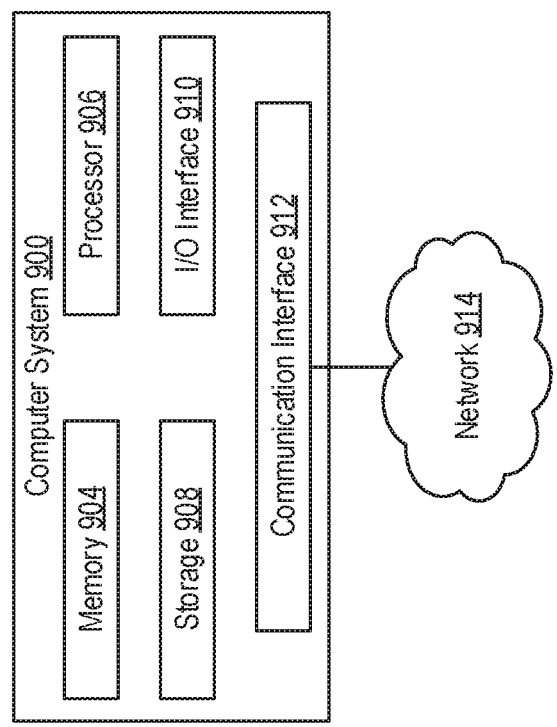
FIG. 9 illustrates a computing system according to an exemplary embodiment of the present disclosure.

FIG. 9 illustrates an example computer system 900 that may be utilized to implement one or more of the devices and/or components of FIG. 1, such as the computing devices 102, 104, 602. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates the computer system 900 taking any suitable physical form. As example and not by way of limitation, the computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 906, memory 904, storage 908, an input/output (I/O) interface 910, and a communication interface 912. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 906 includes hardware for executing instructions, such as those making up a computer program. As an example and not by way of limitation, to execute instructions, the processor 906 may retrieve (or fetch) the instructions from an internal register, an internal cache, memory 904, or storage 908; decode and execute the instructions; and then write one or more results to an internal register, internal cache, memory 904, or storage 908. In particular embodiments, the processor 906 may include one or more internal caches for data, instructions, or addresses. This disclosure contemplates the processor 906 including any suitable number of any suitable internal caches, where appropriate. As an example and not by way of limitation, the processor 906 may include one or more instruction caches, one or more data caches, and one or more translation lookaside buffers (TLBs). Instructions in the instruction caches may be copies of instructions in memory 904 or storage 908, and the instruction caches may speed up retrieval of those instructions by the processor 906. Data in the data caches may be copies of data in memory 904 or storage 908 that are to be operated on by computer instructions; the results of previous instructions executed by the processor 906 that are accessible to subsequent instructions or for writing to memory 904 or storage 908; or any other suitable data. The data caches may speed up read or write operations by the processor 906. The TLBs may speed up virtual-address translation for the processor 906. In particular embodiments, processor 906 may include one or more internal registers for data, instructions, or addresses. This disclosure contemplates the processor 906 including any suitable number of any suitable internal registers, where appropriate. Where appropriate, the processor 906 may include one or more arithmetic logic units (ALUs), be a multi-core processor, or include one or more processors 906. Although this disclosure describes and illustrates a particular processor, this disclosure contemplates any suitable processor.

In particular embodiments, the memory 904 includes main memory for storing instructions for the processor 906 to execute or data for processor 906 to operate on. As an example, and not by way of limitation, computer system 900 may load instructions from storage 908 or another source (such as another computer system 900) to the memory 904. The processor 906 may then load the instructions from the memory 904 to an internal register or internal cache. To execute the instructions, the processor 906 may retrieve the instructions from the internal register or internal cache and decode them. During or after execution of the instructions, the processor 906 may write one or more results (which may be intermediate or final results) to the internal register or internal cache. The processor 906 may then write one or more of those results to the memory 904. In particular embodiments, the processor 906 executes only instructions in one or more internal registers or internal caches or in memory 904 (as opposed to storage 908 or elsewhere) and operates only on data in one or more internal registers or internal caches or in memory 904 (as opposed to storage 908 or elsewhere). One or more memory buses (which may each include an address bus and a data bus) may couple the processor 906 to the memory 904. The bus may include one or more memory buses, as described in further detail below. In particular embodiments, one or more memory management units (MMUs) reside between the processor 906 and memory 904 and facilitate accesses to the memory 904 requested by the processor 906. In particular embodiments, the memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory implementations, this disclosure contemplates any suitable memory implementation.

In particular embodiments, the storage 908 includes mass storage for data or instructions. As an example and not by way of limitation, the storage 908 may include a hard disk drive (HDD), a floppy disk drive, flash memory, an optical disc, a magneto-optical disc, magnetic tape, or a Universal Serial Bus (USB) drive or a combination of two or more of these. The storage 908 may include removable or non-removable (or fixed) media, where appropriate. The storage 908 may be internal or external to computer system 900, where appropriate. In particular embodiments, the storage 908 is non-volatile, solid-state memory. In particular embodiments, the storage 908 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 908 taking any suitable physical form. The storage 908 may include one or more storage control units facilitating communication between processor 906 and storage 908, where appropriate. Where appropriate, the storage 908 may include one or more storages 908. Although this disclosure describes and illustrates particular storage, this disclosure contemplates any suitable storage.

In particular embodiments, the I/O Interface 910 includes hardware, software, or both, providing one or more interfaces for communication between computer system 900 and one or more I/O devices. The computer system 900 may include one or more of these I/O devices, where appropriate. One or more of these I/O devices may enable communication between a person (i.e., a user) and computer system 900. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 910 may include one or more device or software drivers enabling processor 906 to drive one or more of these I/O devices. The I/O interface 910 may include one or more I/O interfaces 910, where appropriate. Although this disclosure describes and illustrates a particular I/O interface, this disclosure contemplates any suitable I/O interface or combination of I/O interfaces.

In particular embodiments, communication interface 912 includes hardware, software, or both providing one or more interfaces for communication (such as, for example, packet-based communication) between computer system 900 and one or more other computer systems 900 or one or more networks 914. As an example and not by way of limitation, communication interface 912 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 914 and any suitable communication interface 912 for the network 914. As an example and not by way of limitation, the network 914 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 912 for any of these networks, where appropriate. Communication interface 912 may include one or more communication interfaces 912, where appropriate. Although this disclosure describes and illustrates a particular communication interface implementations, this disclosure contemplates any suitable communication interface implementation.

The computer system 902 may also include a bus. The bus may include hardware, software, or both and may communicatively couple the components of the computer system 900 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
receiving an audio transmission including symbols, at least a portion of the symbols corresponding to data modulated onto a carrier signal for transmission by the audio transmission;
identifying a first portion of the audio transmission including a first subset of the symbols, the first portion of the audio transmission corresponding to an expected sequence having expected symbols;
comparing the first subset of the symbols to the expected symbols to identify one or more differences between the first subset of the symbols and the expected symbols;
determining, based on the one or more differences between the first subset of the symbols and the expected symbols, a movement speed between a transmitter of the audio transmission and a receiver of the audio transmission;
identifying a second portion of the audio transmission different from the first portion of the audio transmission, the second portion of the audio transmission including a second subset of the symbols; and
correcting the second subset of the symbols based on the movement speed between the transmitter and the receiver.

2. The method of claim 1, wherein identifying the one or more differences between the first subset of the symbols and the expected symbols comprises identifying a phase difference between at least one of the first subset of the symbols and at least one of the expected symbols.

3. The method of claim 2, wherein the expected symbols contain expected frequencies, and wherein comparing the first subset of the symbols to the expected symbols to identify one or more differences between the first subset of the symbols and the expected symbols comprises, for each symbol of the first subset of the symbols:
identifying a first frequency contained by the symbol;
identifying a corresponding expected symbol from among the expected symbols that contains an expected frequency with the same or similar frequency as the first frequency; and
calculating a phase difference between the symbol and the corresponding expected symbol.

4. The method of claim 2, wherein correcting the second subset of the symbols comprises:
calculating, based on the phase difference between the at least one of the first symbol and the expected symbols, one or more phase corrections for the second subset of the symbols; and
correcting a phase of at least one of the second subset of the symbols according to the phase correction.

5. The method of claim 4, wherein calculating one or more phase corrections for the second subset of the symbols comprises:
calculating a phase drift between consecutive symbols of the expected symbols; and
calculating the one or more phase corrections for the second subset of the symbols based on the phase drift.

6. The method of claim 5, wherein the phase drift is calculated such that the phase corrections change linearly for consecutive symbols of the expected symbols.

7. The method of claim 1, wherein determining the movement speed comprises:
determining a correlation between the differences; and
determining the movement speed based on the correlation.

8. The method of claim 1, wherein the movement speed is determined to represent movement of at least one of the transmitter and the receiver along an axis extending between the transmitter and the receiver.

9. The method of claim 1, wherein the transmitter initially generates the first portion of the audio transmission to be identical to the expected sequence.

10. The method of claim 9, wherein the first portion of the audio transmission is a preamble of the audio transmission indicating a beginning of the audio transmission.

11. The method of claim 9, wherein the first portion of the audio transmission is a training sequence of the audio transmission different from a preamble of the audio transmission indicating a beginning of the audio transmission.

12. The method of claim 1, wherein the second portion of the audio transmission includes the portion of the symbols corresponding to the data.

13. A system comprising:
a processor; and
a memory storing instructions which, when executed by the processor, cause the processor to:
receive an audio transmission including symbols, at least a portion of the symbols corresponding to data modulated onto a carrier signal for transmission by the audio transmission;
identify a first portion of the audio transmission including a first subset of the symbols, the first portion of the audio transmission corresponding to an expected sequence having expected symbols;
compare the first subset of the symbols to the expected symbols to identify one or more differences between the first subset of the symbols and the expected symbols;
determine, based on the one or more differences between the first subset of the symbols and the expected symbols, a movement speed between a transmitter of the audio transmission and a receiver of the audio transmission;
identify a second portion of the audio transmission different from the first portion of the audio transmission, the second portion of the audio transmission including a second subset of the symbols; and
correct the second subset of the symbols based on the movement speed between the transmitter and the receiver.

14. The system of claim 13, wherein the memory stores further instructions which, when performed by the processor while identifying the one or more differences between the first subset of the symbols and the expected symbols, cause the processor to identify a phase difference between at least one of the first subset of the symbols and at least one of the expected symbols.

15. The system of claim 14, wherein the expected symbols contain expected frequencies, and wherein the memory stores further instructions which, when performed by the processor while comparing the first subset of the symbols to the expected symbols to identify one or more differences between the first subset of the symbols and the expected symbols cause the processor to, for each symbol of the first subset of the symbols:
identify a first frequency contained by the symbol;
identify a corresponding expected symbol from among the expected symbols that contains an expected frequency with the same or similar frequency as the first frequency; and
calculate a phase difference between the symbol and the corresponding expected symbol.

16. The system of claim 14, wherein the memory stores further instructions which, when performed by the processor while correcting the second subset of the symbols, cause the processor to:
- calculate, based on the phase difference between the at least one of the first symbol and the expected symbols, one or more phase corrections for the second subset of the symbols; and
- correct a phase of at least one of the second subset of the symbols according to the phase correction.

17. The system of claim 16, wherein the memory stores further instructions which, when performed by the processor while calculating one or more phase corrections for the second subset of the symbols, cause the processor to:
- calculate a phase drift between consecutive symbols of the expected symbols; and
- calculate the one or more phase corrections for the second subset of the symbols based on the phase drift.

18. The system of claim 13, wherein the memory stores further instructions which, when performed by the processor while determining the movement speed, cause the processor to:
- determine a correlation between the differences; and
- determine the movement speed based on the correlation.

19. The system of claim 13, wherein the movement speed is determined to represent movement of at least one of the transmitter and the receiver along an axis extending between the transmitter and the receiver.

20. A non-transitory, computer-readable medium storing instructions which, when executed by a processor, cause the processor to:
- receive an audio transmission including symbols, at least a portion of the symbols corresponding to data modulated onto a carrier signal for transmission by the audio transmission;
- identify a first portion of the audio transmission including a first subset of the symbols, the first portion of the audio transmission corresponding to an expected sequence having expected symbols;
- compare the first subset of the symbols to the expected symbols to identify one or more differences between the first subset of the symbols and the expected symbols;
- determine, based on the one or more differences between the first subset of the symbols and the expected symbols, a movement speed between a transmitter of the audio transmission and a receiver of the audio transmission;
- identify a second portion of the audio transmission different from the first portion of the audio transmission, the second portion of the audio transmission including a second subset of the symbols; and
- correct the second subset of the symbols based on the movement speed between the transmitter and the receiver.

* * * * *